(12) United States Patent
Masel et al.

(10) Patent No.: US 7,323,267 B2
(45) Date of Patent: Jan. 29, 2008

(54) LIQUID FEED FUEL CELL WITH NESTED SEALING CONFIGURATION

(75) Inventors: Richard I. Masel, Champaign, IL (US); Gregory Mozsgai, Vancouver (CA)

(73) Assignee: Tekion, Inc., Burnaby, BC (CA)

(*) Notice: Subject to any disclaimer, the term of this patent is extended or adjusted under 35 U.S.C. 154(b) by 642 days.

(21) Appl. No.: 10/960,801

(22) Filed: Oct. 7, 2004

(65) Prior Publication Data

US 2006/0078785 A1 Apr. 13, 2006

(51) Int. Cl.
*H01M 8/10* (2006.01)
(52) U.S. Cl. .......................... 429/30; 429/35; 429/33; 429/44
(58) Field of Classification Search .................. 429/30, 429/33, 34, 38, 35, 39, 40, 42, 44
See application file for complete search history.

(56) References Cited

U.S. PATENT DOCUMENTS

| | | | |
|---|---|---|---|
| 3,198,666 | A | 8/1965 | Grünenberg et al. |
| 4,478,917 | A | 10/1984 | Fujita et al. |
| 4,493,878 | A | 1/1985 | Horiba et al. |
| 5,004,424 | A | 4/1991 | Larminie |
| 5,364,711 | A | 11/1994 | Yamada et al. |
| 5,393,619 | A | 2/1995 | Mayer et al. |
| 5,599,638 | A | 2/1997 | Surampudi et al. |
| 5,773,162 | A | 6/1998 | Surampudi et al. |
| 5,795,665 | A * | 8/1998 | Allen .......................... 429/12 |
| 5,858,569 | A * | 1/1999 | Meacher et al. ............... 429/26 |
| 5,904,740 | A | 5/1999 | Davis |
| 6,020,083 | A | 2/2000 | Breault et al. |
| 6,248,460 | B1 | 6/2001 | Surampudi et al. |
| 6,387,557 | B1 | 5/2002 | Krasij et al. |
| 6,447,941 | B1 | 9/2002 | Tomimatsu et al. |
| 6,458,479 | B1 | 10/2002 | Ren et al. |
| 6,492,047 | B1 | 12/2002 | Peled et al. |
| 6,492,052 | B2 | 12/2002 | Ren |
| 6,495,278 | B1 | 12/2002 | Schmid et al. |
| 6,770,394 | B2 | 8/2004 | Appleby et al. |
| 6,858,339 | B2 * | 2/2005 | Utsunomiya et al. ......... 429/34 |
| 2003/0198852 | A1 | 10/2003 | Masel et al. |
| 2004/0115518 | A1 | 6/2004 | Masel et al. |
| 2006/0127737 | A1* | 6/2006 | Frank et al. .................. 429/35 |

FOREIGN PATENT DOCUMENTS

JP   01-227361   9/1989

OTHER PUBLICATIONS

Rice, C. et al., "Catalysts for direct formic acid fuel cells", *Journal of Power Sources*, 2003, vol. 111, pp. 229-235.
Rhee, Y. et al., "Crossover of formic acid through Nafion® membranes", *Journal of Power Sources*, 2003, vol. 117, pp. 35-38.

(Continued)

*Primary Examiner*—Raymond Alejandro
(74) *Attorney, Agent, or Firm*—McAndrews, Held & Malloy, Ltd.

(57) ABSTRACT

A direct formic acid fuel cell includes a cathode current collector having a perpendicularly extending edge that is capable of cooperating with the perpendicularly extending edge of an anode current collector to effect a press fit. The configuration seals fluids disposed within the volume formed between the current collectors.

30 Claims, 4 Drawing Sheets

OTHER PUBLICATIONS

Ha, S. et al., "A miniature air breathing direct formic acid fuel cell", *Journal of Power Sources*, 2004, vol. 128, pp. 119-124.

Zhu, Y. et al., "High power density direct formic acid fuel cells", *Journal of Power Sources*, 2004, vol. 130, pp. 8-14.

* cited by examiner

LIQUID FEED FUEL CELL WITH NESTED SEALING CONFIGURATION

FIELD OF THE INVENTION

The present invention relates to electrochemical fuel cells. In particular, the present invention relates to a liquid feed fuel cell in which the current collectors have a nested configuration for sealing fluid reactants within the fuel cell.

BACKGROUND OF THE INVENTION

Electrochemical fuel cells convert fuel and oxidant to electricity and reaction product. Solid polymer electrochemical fuel cells generally employ a membrane electrode assembly ("MEA"), which comprises an ion exchange membrane or solid polymer electrolyte disposed between two fluid diffusion layers (FDL). The FDLs can be formed from a variety of electrically conducting materials, such as carbon cloth, carbon paper, metal mesh, or expanded metal foil. The MEA contains a layer of catalyst, typically in the form of finely comminuted precious metal(s) at each membrane/FDL interface to form the electrodes that induce the desired electrochemical reaction. The electrodes are electrically coupled to provide a path for conducting electrons between the electrodes to an external load.

At the anode, the fuel permeates the porous FDL material and reacts at the catalyst layer to form cations, which migrate through the membrane to the cathode. At the cathode, the oxygen-containing gas supply reacts at the catalyst layer to form anions. The anions formed at the cathode react with the cations to form a reaction product.

Fuel cells have been identified as being particularly well-suited for numerous end-uses that employ electrical energy—from microelectronics to power plants. Fuel cells offer numerous advantages to conventional energy sources. For instance, unlike combustion-based energy sources, fuel cells emit virtually no harmful pollutants as reaction by-products. Fuel cells can also operate with renewable fuels, and they can reduce the need for power grid infrastructure since fuel cells can be located at the sites where electrical power is needed.

Of the many different fuel cell types, proton exchange membrane (PEM) fuel cells are thought to be best suited to low-power applications such as hand-held devices. PEM fuel cells can operate at lower temperatures (that is, below the boiling point of water), while still generating relatively high levels of electric energy. PEM fuel cell designs typically employ a polymeric ion exchange membrane as an electrolyte disposed between the cell's anode and cathode. Such ion exchange membrane have asymmetric properties. In this regard, while the membrane can effectively conduct positively charged protons, it blocks the flow of negatively charged electrons. The separation of the electrons and protons results in a voltage potential between the anode and cathode, such that current can flow through an electrical load when attached in circuit with the fuel cell. One of the most promising membrane electrolytes is Nafion®, which is a perfluorosulfonic acid based polymer commercially available from made by E.I. DuPont de Nemours & Company (DuPont).

Two or more fuel cells can be connected together electrically, generally in series but sometimes in parallel, to increase the overall power output of the assembly. In series arrangements in which neighboring fuel cells share oppositely facing surfaces of the same fluid flow field plate, current collection plate or other common component, such a series-connected, multiple fuel cell arrangement is generally referred to as a fuel cell stack, and is usually held together by tie rods and end plates. A plurality of individual fuel cells that are connected in series, but do not necessarily share a common component, is generally referred to as a fuel cell array. Fuel cell stacks and/or arrays typically include intake manifolds and inlet ports for directing the fuel stream and the oxidant stream to the anode and cathode, respectively. Stacks and/or arrays also generally include exhaust manifolds and outlet ports for expelling the exhaust fuel and oxidant streams.

One type of PEM fuel cell (a hydrogen/oxygen fuel cell) employs hydrogen gas as its fuel source. Although the use of hydrogen gas has many favorable properties for fuel cells (such as, for example, the production of pure water as the only reaction product), hydrogen gas is also the least dense of all possible fuels, and is also combustible. Because of its low density and combustibility, hydrogen gas is difficult and expensive to store and transport. Certain fuel cell systems, therefore, include fuel processing subsystems, in which a hydrogen feed stream is generated from a more readily storable and transportable organic feed stock, such as, for example, methane or methanol. In typical fuel processing subsystems, an organic feed stock is converted in a catalytic reactor (commonly referred to as a reformer) to a reformate stream that includes hydrogen and oxidized carbon compounds, including carbon dioxide and, in lesser amounts, carbon monoxide. Since the presence of more than trace amounts of carbon monoxide in the fuel cell feed stream can poison the fuel cell catalyst, selective oxidizer reactors are typically interposed between the reformer and the fuel cell array to further oxidize carbon monoxide to carbon dioxide. Although in significantly accumulated quantities $CO_2$ can be detrimental to the earth's climate, it is benign in relation to fuel cell components when included in a reformate stream fed to a fuel cell. The use of organic fuels as the feed stock for hydrogen/oxygen fuel cells thus increases the size, weight, complexity and cost of hydrogen/oxygen fuel cell systems.

Another type of PEM fuel cell employs organic liquid fuels such as methanol, other alcohols, and organic acids including formic acid. The simplest of these organic liquid feed PEM cells directly oxidize an organic fuel stream without a need to create and store hydrogen gas. These direct organic liquid feed PEM fuel cells avoid problems associated with the use of hydrogen gas as the fuel stream. In direct organic liquid feed fuel cells, the organic fuel oxidizes at the anode, producing free electrons, hydrogen ions (protons) and carbon dioxide. The protons are conducted through the membrane electrolyte to the cathode. The electrons produced from the catalytic reaction at the anode are conducted through an external electrical circuit to the cathode. This migration of hydrogen ions across the membrane creates a voltage potential, and electrons flow from the anode through the electrical load to the cathode via the external circuit. In addition to conducting hydrogen ions, the membrane electrolyte isolates the liquid fuel stream from the oxidant stream. At the cathode, oxygen reacts at the catalyst layer to form anions. The anions formed at the cathode react with the hydrogen ions that have crossed the membrane to form liquid water as the reaction product.

For many end uses, direct organic liquid fuel cells can produce sufficient electrical power using smaller, lighter, less expensive and fewer components than hydrogen/oxygen fuel cells. These qualities make them well suited for providing electrical power to low-wattage consumer electronic devices, such as cellular telephones, cameras, laptop computers, and personal digital assistants, as well as microsensors for analytical and strategic end uses. At present, however, organic liquid feed fuel cells are each capable of generating a relatively low voltage—generally less than 1 Volt apiece—making it necessary or desirable to assemble a plurality of fuel cells into a stack or an array to provide sufficient voltages to drive the desired electronic devices. The presence of multiple cells in an electric power generation system puts increased constraints on fuel cell developers to reduce size, weight and cost of individual fuel cells.

Most direct organic liquid feed fuel cell development to date has focused on using methanol as a fuel source. Methanol is relatively inexpensive, renewable and less flammable than hydrogen gas. However, to date, direct methanol fuel cell (DMFC) developers have been unable to demonstrate a low cost cell that operates efficiently. One shortcoming of DMFCs is that methanol fuel (as well as other alcohol fuels) interacts chemically with perfluorosulfonic membranes, including Nafion membranes. This interaction can result in methanol crossover or diffusion of methanol across the membrane from the anode to the cathode. Once the fuel has crossed the membrane and encountered the cathode, it can no longer participate in the anodic reaction, and moreover, the presence of methanol at the cathode inhibits the desired catalytic reactions at the cathode. In addition, the methanol that has crossed over to the cathode should be removed from the volume around the cathode.

To date, solutions for overcoming the problem of methanol crossover are prohibitively expensive. One such solution, for instance, requires expensive platinum-based catalysts to improve efficiency of the oxidation reaction. Other cost-prohibitive solutions include the use of pumps, sensors, filters and water management systems.

Because of the problems inherent in DMFCs, a few leading-edge fuel cell developers are shifting their focus to cells utilizing a different liquid organic fuel—formic acid. Formic acid, like methanol, is relatively inexpensive, renewable and relatively non-flammable (compared to hydrogen). However, unlike methanol, formic acid does not exhibit problematic levels of crossover caused by interactions with the ion exchange moieties present in perfluorosulfonic acid membranes, such as, for example, those formed from Nafion. The absence of fuel crossover reduces the need for expensive catalysts and other system components associated with methanol-based fuel cell technologies. Because of these lower-cost advantages, direct formic acid fuel cells (DFAFC) show significant promise as a replacement for conventional battery technology in low-power consumer electronic devices.

The use of formic acid in consumer electronics presents some unique concerns in the development commercially viable DFAFCs. First and foremost, formic acid is itself an acid, and can cause skin and eye irritations. Formic acid is also capable of reacting with electrical components, plastics and textiles. DFAFCs employed as power sources low-power consumer electronic devices should therefore prevent formic acid leakage from within the fuel cell structure. At the same time, a DFAFCs should employ a convenient mechanism for venting the anode and refueling the cell. A suitable fuel cell sealing solution that accommodates refueling and venting would promote the commercially viability of DFAFCs.

As with DMFCs, the formic acid fuel should be contained within the anode to promote efficiency and reduce costs. As previously discussed in connection with DMFCs, once the fuel migrates across the membrane to the cathode portion of the fuel cell, a host of problems arise, including loss of fuel for the anodic reaction, contamination of the cathode, and the need to remove fuel from the cathode. A suitable containment technique would inhibit or prevent formic acid leakage into the volume around the cathode or into the external volume surrounding the fuel cell itself.

In attempting to overcome the problem of formic acid leakage, previous DFAFCs have employed techniques to effect sealing while and the same time reducing the size, weight and cost of the DFAFC. Some prior techniques include the use of bulky and expensive hardware such as screws, bolts, and fasteners. Other techniques require complicated pressing techniques at high temperatures under highly controlled conditions. Yet another drawback of previously available assemblies is that the designs impose compressive forces on the sealing components which can cause these components to physically deteriorate and sometimes tear.

A small, light and inexpensive DFAFC is needed to effective seal formic acid within the fuel cell and that can be assembled without costly production techniques. Such a device should where possible reduce physical stresses imposed on the sealant layers of DFAFCs. Preferably, the DFAFC design should also accommodate the need to make a stack or array of cells. Finally, a commercially viable DFAFC design should allow for simple refueling of the device and for adequate ventilation of the anodic reaction.

SUMMARY OF THE INVENTION

One or more shortcomings of prior, conventional liquid feed fuel cell designs are overcome by the present liquid feed fuel cell with a nested sealing configuration. In one embodiment, a direct liquid feed fuel cell includes an anode current collector, anode diffusion layer, electrically insulative layer, cathode diffusion layer, and cathode current collector. Each of these sub-components are generally layered in the foregoing order. The electrically insulative layer further includes a membrane electrolyte assembly (MEA). The MEA further includes a membrane electrolyte layer with electrocatalyst layers disposed on both the anode-facing and cathode facing surfaces of the membrane electrolyte layer.

Isolated by the electrically insulative layer, the anode current collector and the cathode current collector have edges which can be press fit to form a partial seal to contain fluids, such as formic acid, within the liquid feed fuel cell, and to promote cation diffusion from the anode diffusion layer to the cathode diffusion layer. The membrane electrolyte layer can also have an edge which can be press-fit between the anode current collector edge and cathode current collector edge. Additionally, the electrically insulative layer can include bands of sealant, such as silicone, on the edge portion which create a partial seal to contain fluids, such as formic acid, inside the fuel cell. In one embodiment, there are two bands of sealant. The first band is between the anode current collector edge and the membrane electrolyte edge. The second band is between the cathode current collector edge, and the membrane electrolyte edge.

The fuel cell reaction can be driven by directing liquid fuel such as formic acid towards the anode diffusion layer through openings in the anode current collector. Similarly, an oxidant such as oxygen contained in air can be directed towards the cathode diffusion layer through openings in the cathode current collector.

Two or more direct liquid feed fuel cells can be arranged along with a frame to create a fuel cell array. The frame, which can be constructed from a rigid polymeric material such as polycarbonate, has two edge portions, each portion containing a channel. Each channel can accommodate the extending edge portions of at least one direct liquid feed fuel cell. In this configuration, the frame and the two (or more) fuel cells create a reservoir in which the liquid fuel is stored. An adhesive can be used in the frame channels to assist in sealing the liquid fuel inside the array. The frame can have a passage from the inside the array to outside the array to facilitate fluid diffusion at the anode current collectors.

DETAILED DESCRIPTION OF PREFERRED EMBODIMENT(S)

Figure 1:
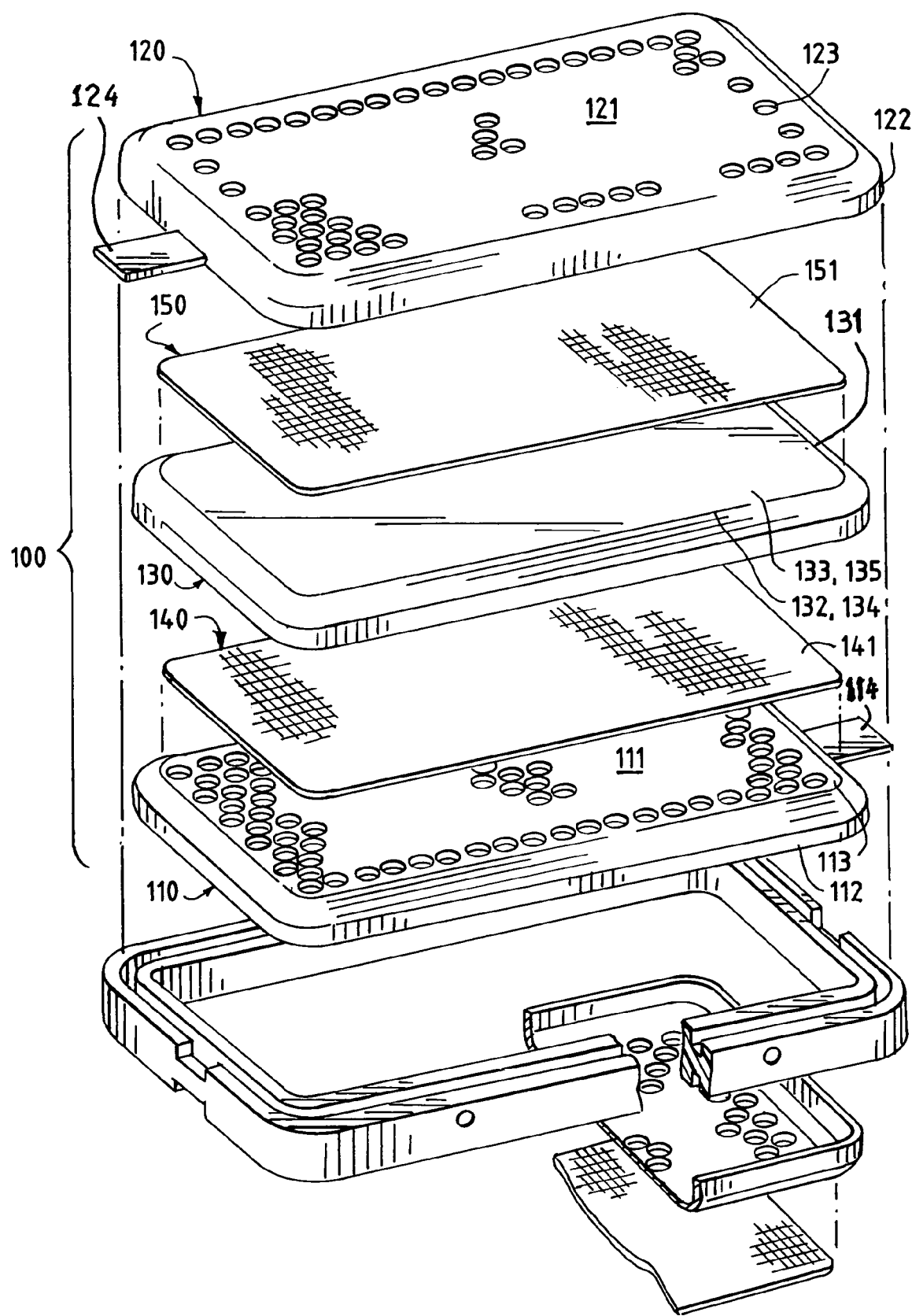
FIG. 1 is an exploded perspective view of a direct liquid feed fuel cell, illustrating the relationship among the various components in unassembled form.

Turning first to FIG. 1, a single direct liquid feed fuel cell 100 includes an anode current collector 110 cathode current collector 120. The anode current collector 110 is electrically conductive, and has a major planar portion 111 and an edge 112 that extends substantially perpendicularly from and substantially circumscribes the anode current collector major planar portion 111. Extending from the anode current collector edge 112 is an anode current collector electrical connection tab 114. The anode current collector electrical connection tab 114 facilitates connection of the fuel cell 100 in an electrical circuit as illustrated, by example, in FIG. 4. Of course, the anode current collector electrical connection tab 114 can be oriented so as to touch other parts of the anode current collector 110 because of the anode current collector's electrically conductive properties. The anode current collector major planar portion 111 has openings 113 formed therein that facilitate fluid diffusion through the anode current collector. By way of example, the anode current collector 110 can be formed from gold-plated titanium.

The cathode current collector 120 has a major planar portion 121 and an edge 122 that extends substantially perpendicularly from and substantially circumscribes the cathode current collector major planar portion 121. Extending from the cathode current collector edge 122 is an cathode current collector electrical connection tab 124. The cathode current collector electrical connection tab 124 facilitates connection of the fuel cell 100 in an electrical circuit as illustrated, by example, in FIG. 4. Of course, it is obvious that the cathode current collector electrical connection tab 124 can be oriented to touch other parts of the cathode current collector 120 because of the cathode current collector's electrically conductive properties. The cathode current collector major planar portion 121 has openings 123 formed therein that facilitate fluid diffusion through the cathode current collector. By way of example, the cathode current collector 120 can be formed from gold-plated titanium.

As further shown in FIG. 1, a membrane electrode assembly 130 ("MEA") is interposed between the anode current collector 110 and the cathode current collector 120. The MEA 130 includes a membrane electrolyte 131 with two oppositely facing major planar surfaces 132, 133. One of the MEA major planar surfaces 132 faces the anode, and the other major planar surface 133 faces the cathode. On the anode-facing MEA major planar surface 132, a first electrocatalyst layer 134 is disposed. On the cathode-facing MEA major planar surface 133, a second electrocatalyst layer 135 is disposed. By way of particular example, the membrane electrolyte 131 can be formed from a perfluorosulfonic acid membrane, such as Nafion.

An anode fluid diffusion layer 140 is interposed between the anode current collector 110 and the MEA 130. The anode fluid diffusion layer 140 includes an electrically conductive material 141. By way of example, this electrically conductive material 141 can be formed from stainless steel mesh, gold-plated stainless steel mesh, solid gold mesh, gold plated titanium mesh, titanium mesh, niobium mesh, gold plated niobium mesh, platinum plated niobium mesh, palladium plated niobium mesh, carbon cloth, carbon paper, Teflon coated carbon cloth, Teflon coated carbon paper, gold plated expanded niobium foil, platinum plated niobium foil, or palladium plated niobium foil.

A cathode fluid diffusion layer 150 is interposed between the cathode current collector 120 and the MEA 130. The cathode fluid diffusion layer 150 includes an electrically conductive material 151. By way of example, this electrically conductive material 151 can be formed from stainless steel mesh, gold-plated stainless steel mesh, solid gold mesh, gold plated titanium mesh, titanium mesh, niobium mesh, gold plated niobium mesh, platinum plated niobium mesh, palladium plated niobium mesh, carbon cloth, carbon paper, Teflon coated carbon cloth, Teflon coated carbon paper, gold plated expanded niobium foil, platinum plated niobium foil, or palladium plated niobium foil.

Figure 5:
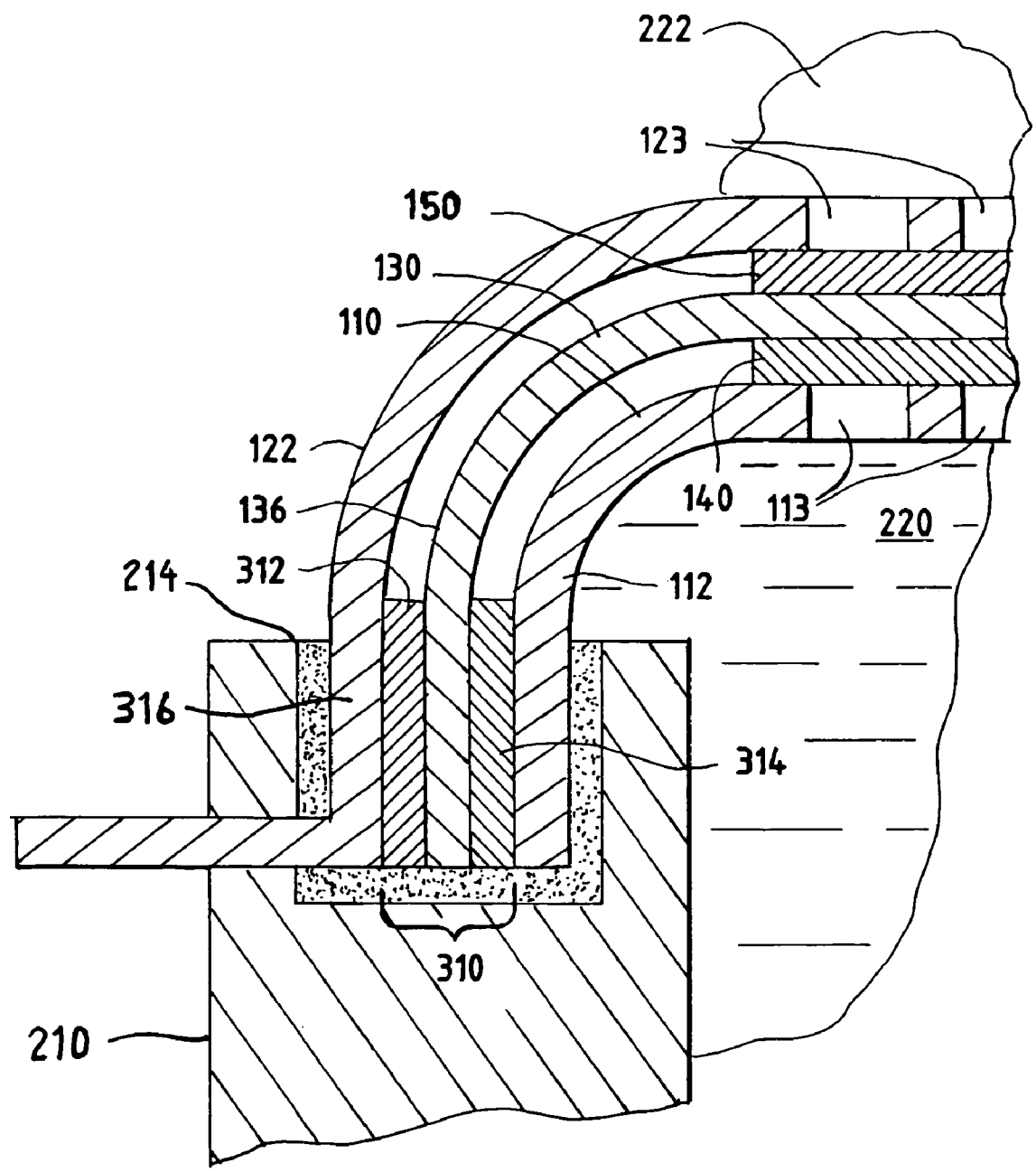
FIG. 5 is a cross-sectional view of a part of the fuel cell and fuel cell array illustrated in FIG. 3.

Turning to FIG. 5, the edge of the cathode current collector 122 can be press fit onto the edge of the anode current collector 112 to form a partial seal. In order to maintain electrical isolation between the anode and cathode, a layer of electrically insulative material 310 should be placed between the anode current collector and the cathode collector. In this application, the term "electrically insulative material" means a material that is a better insulator for electrons than for protons. Electrically insulative materials include traditional insulators such as rubber, glass, air, and silicone. Electrically insulative materials also include ion exchange membranes that block the flow of electrons while allowing the flow of H+ ions. Nafion is an example of an ion exchange membrane that is an electrically insulative material. The cathode-anode partial seal assists in containing fluids disposed between the anode current collector 110 and the cathode current collector 120. The cathode-anode partial seal can be further enhanced with a sealant 312, 314.

In another embodiment, the MEA 130 has an edge 136 that circumscribes either of the MEA oppositely facing major planar surfaces 132, 133. The cathode current collector edge 122 can be press fit with the MEA edge 136 to form a partial seal. The cathode-MEA partial seal can be further enhanced with a sealant 312. The cathode-MEA partial seal assists in containing fluids disposed between the cathode current collector 120 and the MEA 130. During the press-fitting, the presence of the uncured sealant 312 helps lubricate the MEA edge 136 to prevent tearing.

The MEA edge 136 can also be press fit with the anode current collector edge 112 to form a partial seal. The anode-MEA partial seal can be further enhanced with a sealant 314. The anode-MEA partial seal assists in containing fluids disposed between the anode current collector 110 and the MEA 130. During the press-fitting, the presence of the uncured sealant 314 helps lubricate the MEA edge 136 to prevent tearing.

In a preferred embodiment, a liquid fuel stream 220 is directed through the openings 113 in the anode current collector major planar portion 111 and towards the anode fluid diffusion layer 140. A fluid oxidant 222 is directed through the openings 123 of the cathode current collector major planar portion 121, and towards the cathode fluid diffusion layer 150. In the exemplary fuel cell, the liquid fuel stream 220 includes formic acid, and the fluid oxidant 222 includes oxygen-containing air. Because formic acid displays corrosive properties, sealants 312, 314 should be appropriately resistant to formic acid. One suitable sealant that did not fail through extended use with formic acid is silicone sealant, such as PDMS Silicone Elastomer available from Dow Corning®.

Figure 2:
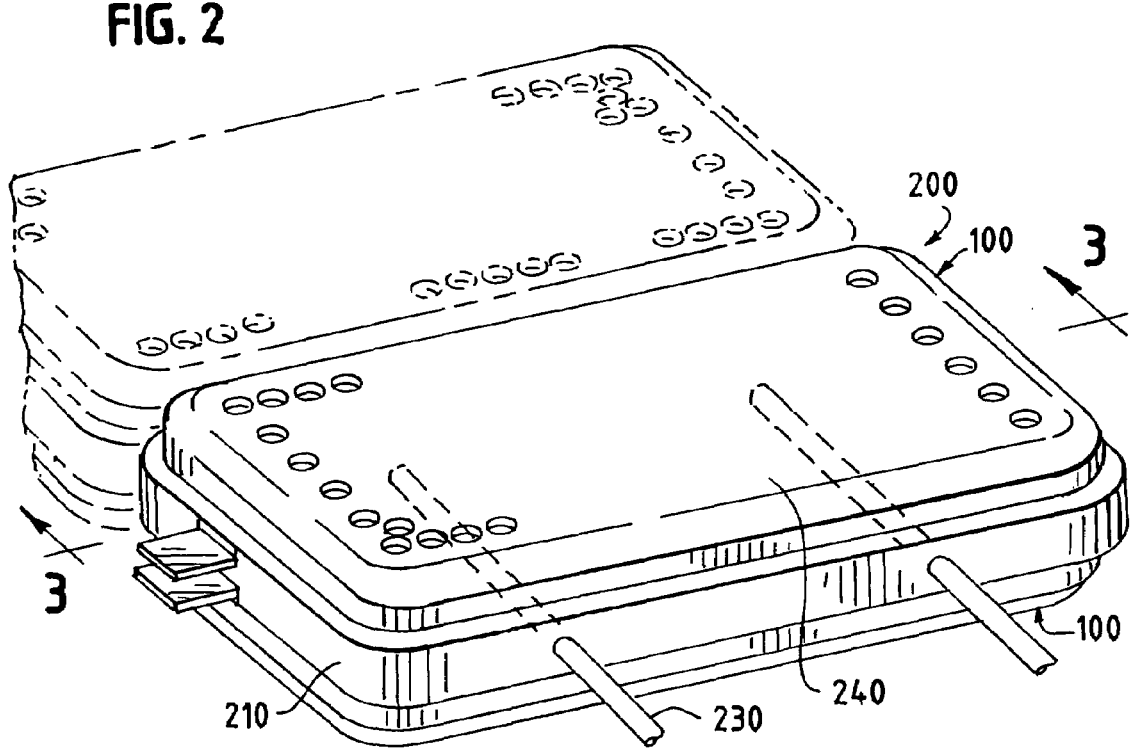
FIG. 2 is a perspective view of an array of direct liquid feed fuel cells of the type illustrated in FIG. 1, each in assembled form.
Figure 3:
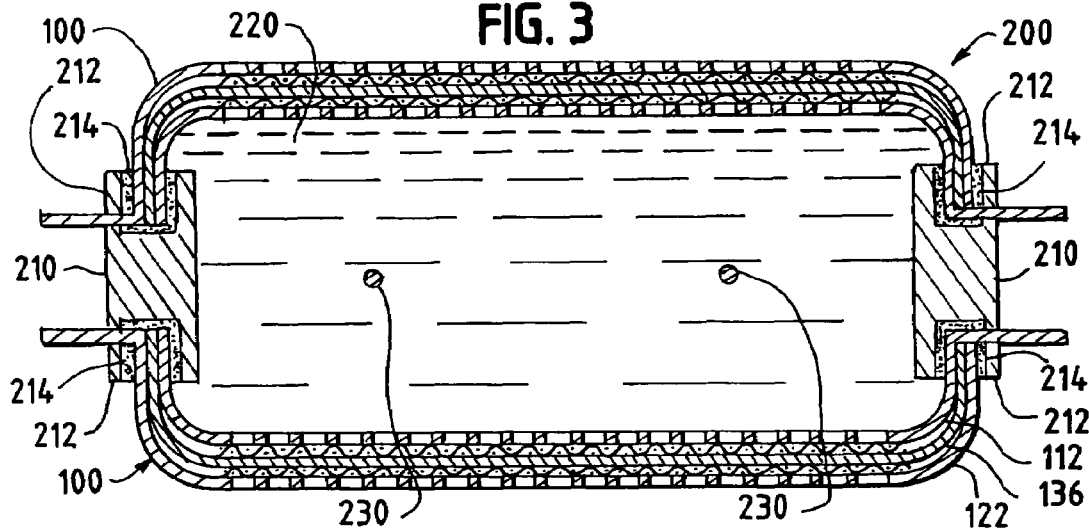
FIG. 3 is a cross-sectional view of the fuel cell and fuel cell array illustrated in FIGS. 1 and 2.

Turning now to FIGS. 2 and 3, a direct liquid feed fuel cell array 200 includes at least two direct liquid feed fuel cells 100, as described above, and a frame 210. As an example, the frame 210 can be formed from a rigid electrical insulator, such as a polycarbonate material, Kel-F®, or Teflon®.

The frame 210 has at least two edge portions 212, and each edge portion 212 contains a channel 214. Each channel 214 can accommodate an anode current collector edge 112 and a cathode current collector edge 122. In another embodiment, each channel can further accommodate a membrane electrolyte edge 136.

The array 200 is constructed such that the frame 210 and the at least two direct liquid feed fuel cells 100 create a partially enclosed volume 240. Inside the volume 240, fluids 220 are disposed. The fluids 220 are partially contained by the frame 210 and the at least two direct liquid feed fuel cells 100. In one embodiment, one of the fluids 220 disposed inside the volume 240 of the array 200 is an organic liquid fuel, such as formic acid. Turning back to FIG. 5, in a further embodiment an adhesive 316 can be used to bond the fuel cell assembly edge portions 112, 122, or 136 with the fuel cell array frame channels 214, in order to further contain fluids disposed inside the volume of the array 200. As discussed above, in life tests, silicone sealant performs well when used with formic acid.

Turning to FIGS. 2 and 3, in another embodiment the frame has one or more passages 230 that transverse the main body of the frame 210 to the partially enclosed volume 240. The passages 230 allow for convenient refueling of fluids 220, and for venting of the anodic oxidation reaction.

Figure 4:
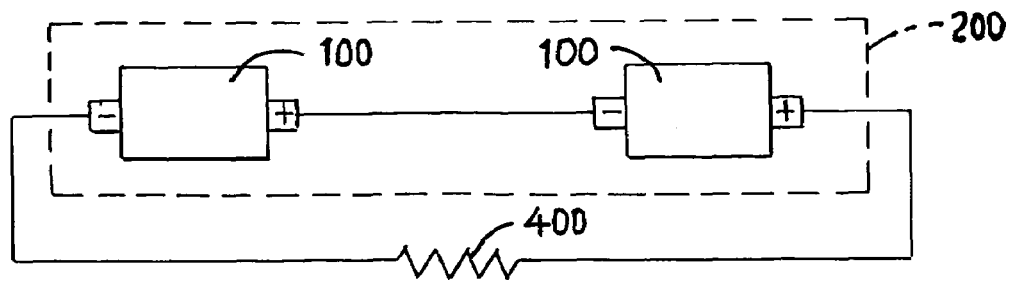
FIG. 4 is a circuit diagram of an array of electrically series connected fuel cells with an external load connected across the circuit.

Turning to FIG. 4, an array 200 consisting of two fuel cells 100 is shown in an electrical circuit. The fuel cells 100 are connected in series and a resistive load 400 is placed across the series of fuel cells. In this configuration, electrical power can be generated as current flows through the resistive load 400.

Figure 6:
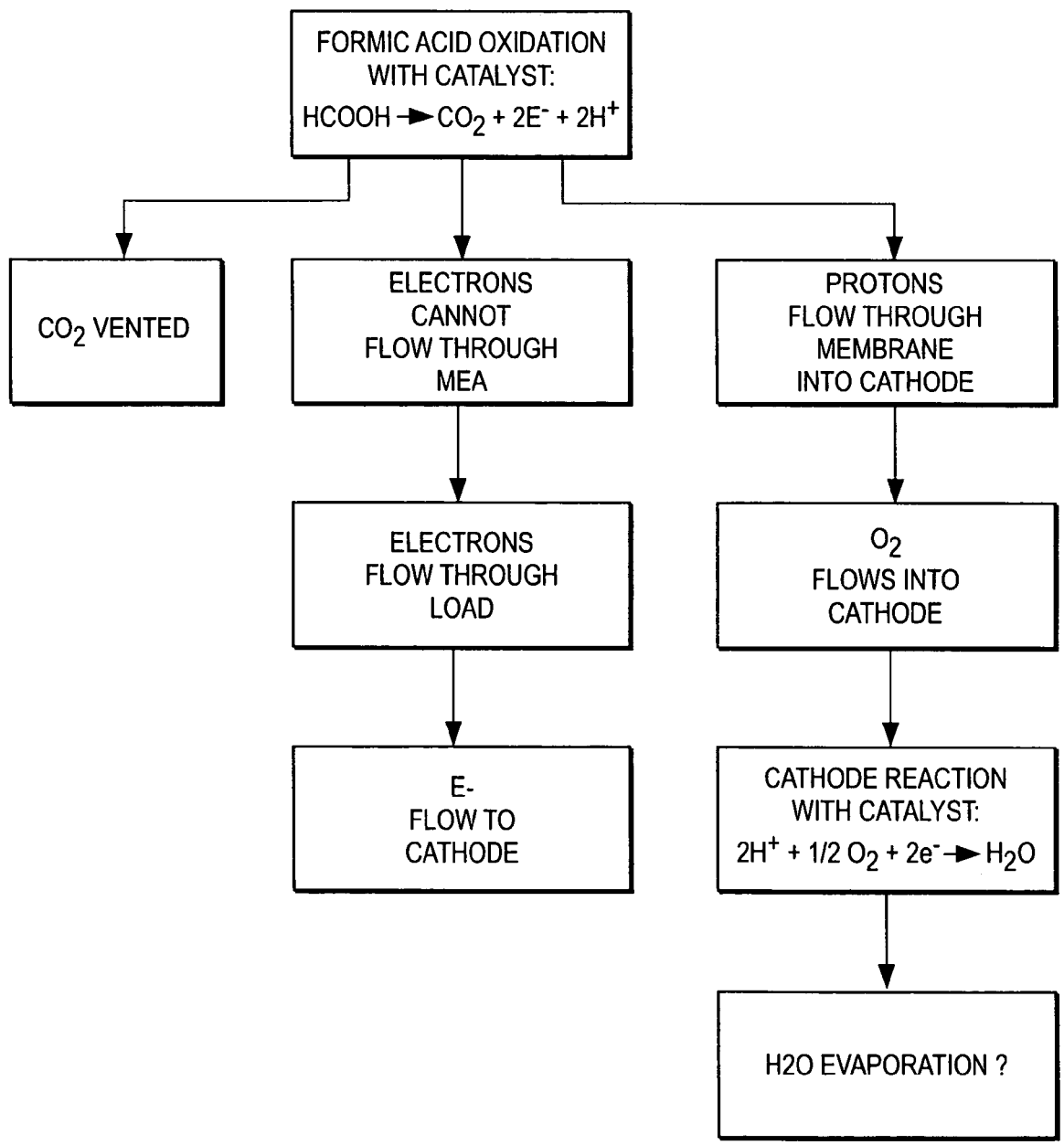
FIG. 6 is a flow diagram of the processing steps undergone by the reactant and reaction product constituents in fuel cells of the type illustrated of FIGS. 1-5.

FIG. 6 illustrates, in a flow diagram, the processing steps undergone by the reactant and reaction product constituents in fuel cells of the type illustrated of FIGS. 1-5.

While particular elements, embodiments and applications of the present invention have been shown and described, it will be understood, of course, that the invention is not limited thereto since modifications can be made by those skilled in the art without departing from the scope of the present disclosure, particularly in light of the foregoing teachings.

What is claimed is:

1. A fuel cell comprising:
   (a) an anode current collector having a major planar portion and at least one edge that extends substantially perpendicularly from and substantially circumscribes said anode current collector major planar portion, said anode current collector major planar portion having at least one opening formed therein for facilitating fluid diffusion through said anode current collector;
   (b) a cathode current collector having a major planar portion and at least one edge that extends substantially perpendicularly from and substantially circumscribes said cathode current collector major planar portion, said cathode current collector major planar portion having at least one opening formed therein for facilitating fluid diffusion through said cathode current collector;
   (c) at least one layer of electrically insulative material interposed between said anode current collector and said cathode current collector, said electrically insulative material further including a membrane electrode assembly (MEA), said MEA comprising a membrane electrolyte having two oppositely facing major planar surfaces, a first electrocatalyst layer disposed on one of said electrolyte surfaces and a second electrocatalyst layer disposed on the other of said electrolyte surface;
   (d) an anode fluid diffusion layer interposed between said anode current collector and said MEA, said anode fluid diffusion layer at least partially comprising an electrically conductive material;
   (e) a cathode fluid diffusion layer interposed between said cathode current collector and said MEA, said cathode fluid diffusion layer at least partially consisting of an electrically conductive material;
wherein said perpendicularly extending edge of said cathode current collector is configured to cooperate with the said perpendicularly extending edge of said anode current collector to effect a press fit, thereby at least partially sealing fluids disposed within the volume formed between said current collector major portions, and thereby at least partially promoting the diffusion of cations from said anode diffusion layer to said cathode diffusion layer.

2. The fuel cell of claim 1 wherein said membrane electrolyte comprises a perfluorosulfonic acid membrane.

3. The fuel cell of claim 1 wherein said membrane electrolyte has at least one edge that extends substantially perpendicularly from and substantially circumscribes said oppositely facing major planar portions, said membrane electrolyte perpendicularly extending edge interposed between said anode current collector perpendicularly extending edge and said cathode current collector perpendicularly extending edge, thereby forming a seal between the perpendicularly extending edges of said current collectors.

4. The fuel cell of claim 3 wherein said membrane electrolyte having at least one perpendicularly extending edge is a membrane electrolyte having only one edge.

5. The fuel cell of claim 1 wherein a liquid fuel is directed to said anode fluid diffusion layer and a fluid oxidant is directed to said cathode fluid diffusion layer.

6. The fuel cell of claim 5 wherein said liquid fuel stream is selected from the group consisting essentially of formic acid, methanol, methyl formate, ethanol, propanol, sodium borohydride, alcohols, and esters.

7. The fuel cell of claim 6 wherein said liquid fuel stream comprises formic acid.

8. The fuel cell of claim 5 wherein said fluid oxidant is oxygen-containing air.

9. The fuel cell of claim 1 wherein the material comprising said anode fluid diffusion layer and said cathode diffusion layer is selected from the group of materials consisting essentially of electrically conductive mesh, electrically conductive expanded foil, or electrically conductive cloth.

10. The fuel cell of claim 1 wherein said anode and cathode comprise gold-plated titanium.

11. The fuel cell of claim 1 wherein said at least one layer of electrically insulative material further comprises a sealant.

12. The fuel cell of claim 11 wherein said sealant is silicone.

13. A fuel cell array comprising at least two fuel cells, each of said fuel cells comprising:
(a) an anode current collector having a major planar portion and at least one edge that extends substantially perpendicularly from and substantially circumscribes said anode current collector major planar portion, said anode current collector major planar portion having at least one opening formed therein for facilitating fluid diffusion through said anode current collector;
(b) a cathode current collector having a major planar portion and at least one edge that extends substantially perpendicularly from and substantially circumscribes said cathode current collector major planar portion, said cathode current collector major planar portion having at least one opening formed therein for facilitating fluid diffusion through said cathode current collector;
(c) at least one layer of electrically insulative material disposed between said anode current collector and said cathode current collector, said electrically insulative material further including a membrane electrode assembly (MEA) interposed between said anode current collector and cathode current collector, said MEA comprising a membrane electrolyte having two oppositely facing major planar surfaces, a first electrocatalyst layer disposed on one of said membrane surfaces and a second electrocatalyst layer disposed on the other of said membrane surfaces;
(d) an anode fluid diffusion layer interposed between said anode current collector and said MEA, said anode fluid diffusion layer at least partially comprising an electrically conductive material;
(e) a cathode fluid diffusion layer interposed between said cathode current collector and said MEA, said cathode fluid diffusion layer at least partially comprising an electrically conductive material;
said fuel cell array further comprising a frame having at least two edge portions, each of said edge portions having a channel formed therein for accommodating said perpendicularly extending edges of said anode and cathode current collectors, thereby substantially containing fluids disposed within the volume formed within said fuel cell array.

14. The fuel cell array of claim 13 wherein said membrane electrolyte comprises a perfluorosulfonic acid membrane.

15. The fuel cell array of claim 13 wherein said membrane electrolyte has at least one edge that extends substantially perpendicularly from and substantially circumscribes said oppositely facing major planar portions, said perpendicularly extending edge interposed between said anode current collector perpendicularly extending edge and said cathode current collector perpendicularly extending edge, thereby forming a seal between the perpendicularly extending edges of said current collectors.

16. The fuel cell array of claim 13 wherein said membrane electrolyte having at least one perpendicularly extending edge is a membrane electrolyte having only one edge.

17. The fuel cell array of claim 13 wherein a liquid fuel is directed to said anode fluid diffusion layer and a fluid oxidant is directed to said cathode fluid diffusion layer.

18. The fuel cell array of claim 17 wherein said liquid fuel comprises a constituent selected from the group consisting essentially of formic acid, methanol, methyl formate, ethanol, propanol, sodium borohydride, alcohols, and esters.

19. The fuel cell array of claim 18 wherein said liquid fuel comprises formic acid.

20. The fuel cell array of claim 17 wherein said fluid oxidant is gaseous oxygen.

21. The fuel cell array of claim 13 wherein said frame is formed from an electrically insulative, substantially rigid material.

22. The fuel cell array of claim 21 wherein said electrically insulative, substantially rigid material is polymeric.

23. The fuel cell array of claim 22 wherein said polymeric material is polycarbonate.

24. The fuel cell array of claim 13 wherein said frame has at least one passage transversing from said frame's interior volume to said frame's exterior volume.

25. The fuel cell array of claim 24 wherein said at least one passage facilitates fluid diffusion to said fuel cell's anode current collector.

26. The fuel cell array of claim 13 wherein said frame channel and said perpendicularly extending edge portions of said anode and cathode current collectors are at least partially joined with an adhesive.

27. A fuel cell comprising:
(a) an anode current collector having a major planar portion and at least one edge that extends substantially perpendicularly from and substantially circumscribes said anode current collector major planar portion;
(b) a cathode current collector having a major planar portion and at least one edge that extends substantially perpendicularly from and substantially circumscribes said cathode current collector major planar portion, said cathode current collector major planar portion having at least one opening formed therein for facilitating fluid diffusion through said cathode current collector;
(c) at least one layer of electrically insulative material disposed between said anode current collector and said cathode current collector, said electrically insulative material further including a sealant and a membrane electrode assembly (MEA) interposed between said anode current collector and cathode current collector, said MEA comprising a membrane electrolyte having two oppositely facing major planar surfaces, a first electrocatalyst layer disposed on one of said membrane surfaces and a second electrocatalyst layer disposed on the other of said membrane surfaces;
(d) an anode fluid diffusion layer interposed between said anode current collector and said MEA, said anode fluid diffusion layer at least partially consisting of an electrically conductive material;

(e) a cathode fluid diffusion layer interposed between said cathode current collector and said MEA, said cathode fluid diffusion layer at least partially consisting of an electrically conductive material;

wherein said perpendicularly extending edge of said cathode current collector is configured to cooperate with the said perpendicularly extending edge of said anode current collector to effect a press fit, and wherein said sealant seals said perpendicularly extending edges of said anode current collector and said cathode current collector, thereby at least partially sealing fluids disposed within the volume formed between said current collector major portions.

28. The fuel cell of claim 27 wherein said membrane electrolyte has at least one edge that extends substantially perpendicularly from and substantially circumscribes said oppositely facing major planar portions, said perpendicularly extending edge interposed between said anode current collector perpendicularly extending edge and said cathode current collector perpendicularly extending edge, thereby forming a seal between the perpendicularly extending edges of said current collectors.

29. The fuel cell of claim 28 wherein the at least one layer of electrically insulating material further comprises two bands of said sealant, a first band interposed between said anode current collector perpendicularly extending edge and said membrane electrolyte perpendicularly extending edge, a second band interposed between said cathode current collector perpendicularly extending edge and said membrane electrolyte perpendicularly extending edge.

30. The fuel cell of claim 27 wherein said sealant is silicone.

* * * * *